US008823680B2

(12) United States Patent
Ho et al.

(10) Patent No.: US 8,823,680 B2
(45) Date of Patent: Sep. 2, 2014

(54) ELIMINATION OF ENVIRONMENTAL INTERFERENCE TO A CAPACITIVE TOUCH PAD BY A DUMMY TRACE

(75) Inventors: Han-Chang Ho, New Taipei (TW); Cheng-Hui Lin, Pingtung County (TW); Kuo-Ming Huang, New Taipei (TW); Kuo-Tai Wang, New Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 157 days.

(21) Appl. No.: 13/438,096

(22) Filed: Apr. 3, 2012

(65) Prior Publication Data
US 2012/0256875 A1 Oct. 11, 2012

(30) Foreign Application Priority Data

Apr. 8, 2011 (TW) .............................. 100112250 A

(51) Int. Cl.
*G06F 3/044* (2006.01)
(52) U.S. Cl.
USPC ..... 345/174; 345/173; 178/18.01; 178/18.06; 463/37
(58) Field of Classification Search
CPC .......... G06F 3/044; G06F 2203/04107; G06F 2203/04111
USPC ............ 345/156, 173–179; 178/18.01–18.09; 463/37–38
See application file for complete search history.

(56) References Cited

U.S. PATENT DOCUMENTS

| 7,339,579 | B2 | 3/2008 | Richter et al. |
| 7,567,240 | B2 | 7/2009 | Peterson, Jr. et al. |
| 2003/0067451 | A1 | 4/2003 | Tagg et al. |
| 2006/0227114 | A1 | 10/2006 | Geaghan et al. |
| 2007/0034423 | A1 | 2/2007 | Rebeschi et al. |
| 2008/0024461 | A1* | 1/2008 | Richter et al. ................. 345/173 |
| 2008/0047764 | A1* | 2/2008 | Lee et al. ................... 178/18.06 |
| 2008/0225015 | A1 | 9/2008 | Hashida |
| 2010/0128000 | A1* | 5/2010 | Lo et al. ......................... 345/174 |
| 2010/0163394 | A1* | 7/2010 | Tang et al. ..................... 200/600 |
| 2011/0074701 | A1* | 3/2011 | Dickinson et al. ............. 345/173 |
| 2011/0291986 | A1* | 12/2011 | Rebeschi et al. .............. 345/174 |

FOREIGN PATENT DOCUMENTS

| CN | 1918538 A | 2/2007 |
| CN | 101243385 A | 8/2008 |
| TW | 200705248 | 2/2007 |
| TW | 200707269 | 2/2007 |
| TW | 201025103 A1 | 7/2010 |
| TW | M383780 U1 | 7/2010 |

* cited by examiner

*Primary Examiner* — Lun-Yi Lao
*Assistant Examiner* — Md Saiful A Siddiqui
(74) *Attorney, Agent, or Firm* — Rosenberg, Klein & Lee

(57) ABSTRACT

A capacitive touch pad includes a sensor layer for sensing a touch of an object and a dummy trace below the sensor layer. The dummy trace is sensed to obtain a sensed value while the dummy trace is shielded by the sensor layer from interference of the object such that the sensed value reflects only environmental variation. Therefore, environmental variation can be identified depending on the sensed value, and the sensor layer can be calibrated properly.

9 Claims, 4 Drawing Sheets

ELIMINATION OF ENVIRONMENTAL INTERFERENCE TO A CAPACITIVE TOUCH PAD BY A DUMMY TRACE

FIELD OF THE INVENTION

The present invention is related generally to a capacitive touch pad and, more particularly, to a capacitive touch pad using a dummy trace to eliminate environmental interference.

BACKGROUND OF THE INVENTION

A capacitive touch pad uses a capacitor formed by two conductive plates as a sensor, whose capacitance C is determined by $$C = \frac{\varepsilon A}{d}, \quad [\text{Eq-1}]$$

where A is the overlapping area of the two conductive plates, d is the distance between the two conductive plates, and $\varepsilon$ is the dielectric constant of the dielectric layer between the two conductive plates. When a conductive object, for example a finger, is placed on the capacitive touch pad, the conductive object functions as an extra conductive plate and causes variation in the capacitance C. To measure the variation in the capacitance C, the capacitor is charged and discharged with a constant current I in a fixed period of time T to generate a voltage $$V = \frac{I \times T}{C}, \quad [\text{Eq-2}]$$

which shows that the voltage V changes with the capacitance C, and thus it may identify whether a conductive object is placed on the capacitive touch pad depending on the variation in the voltage V. Substitution of the equation Eq-1 into the equation Eq-2 results in $$V = \frac{(I \times T) \times d}{\varepsilon A}, \quad [\text{Eq-3}]$$

which shows that the voltage V may also be affected by any factor such as temperature, moisture, deformation by a heavy load, and so on that would change the current I, the dielectric constant $\varepsilon$, the area A and the distance d. Therefore, the sensed value of the capacitive touch pad is subject to not only the conductive object thereon but also the environmental interference.

FIG. 1 schematically shows how a capacitive touch pad is affected by a pressure. A capacitive touch pad 10 has a sensor layer 12 and a shielding layer 14. When the operation surface of the capacitive touch pad 10 is subjected to and deformed by a pressure, the sensing area of the sensor layer 12 will be reduced due to the deformation of the sensor layer 12. According to the equation Eq-1, the capacitance C decreases when the area A is reduced and hence, the pressure has certain impact on the sensing result of the capacitive touch pad 10. Taking the variations of the sensed value as shown in FIG. 2 for example, in which the sensed value represents the capacitance C generated by analog-to-digital conversion (ADC) of the voltage V, a firmware will execute for calibration and setting of environment dependent parameters before capacitance sensing such that all the sensed values across the capacitive touch pad without any touch will remain between twenty and forty, as shown in the upper left plot in FIG. 2, to eliminate the error caused by environment factors. When an object applies a pressure onto the capacitive touch pad, the sensing area is reduced due to the compression and consequently, the sensed values will be lowered as shown in the upper right plot in FIG. 2. At this moment, in order to restore the sensed values to the normal range fit to be shown, the firmware performs calibration to adjust the related parameters such that the sensed values are brought back to the range between twenty and forty, as shown in the lower right plot in FIG. 2. When the pressure is released, the sensing area A of the sensor layer 12 resumes its original condition, causing the capacitance C increased. However, as the parameters in the firmware remain those set for the presence of the pressure, the sensed values, which are generated from the aforesaid ADC conversion, rapidly rebounds as shown in the lower left plot in FIG. 2. This leads to a misjudgment that a conductor is in contact with the capacitive touch pad.

Therefore, it is desired a structure and method for a capacitive touch pad to eliminate the environmental interference.

SUMMARY OF THE INVENTION

An objective of the present invention is to provide a capacitive touch pad using a dummy trace to eliminate the environmental interference thereto.

Another objective of the present invention is to provide a method for eliminating the environmental interference to a capacitive touch pad.

According to the present invention, a dummy trace is arranged below a sensor layer of a capacitive touch pad. The dummy trace is sensed to obtain a sensed value while the dummy trace is shielded by the sensor layer from interference of the object above the sensor layer such that the sensed value reflects only environmental variation. Therefore, environmental variation can be identified depending on the sensed value, and the sensor layer can be calibrated properly.

According to the present invention, a method for eliminating environmental interference to a capacitive touch pad having a sensor layer for sensing a touch of an object and a dummy trace below the sensor layer, includes sensing the dummy trace to obtain a sensed value while the dummy trace is shielded by the sensor layer from interference of the object such that the sensed value reflects only environmental variation, comparing a difference between the sensed value and a base value with a threshold value, and calibrating the sensor layer if the difference is greater than the threshold value.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

In order to eliminate the environmental interference to a capacitive touch pad, the present invention uses a dummy trace to sense the environmental variation. The dummy trace is preferably arranged below a sensor layer of the capacitive touch pad so as not to be affected by the finger on the capacitive touch pad. While the dummy trace is sensed, the sensor layer functions as a shielding structure to separate the dummy trace from the finger above the sensor layer. Thus, the sensed value of the dummy trace will only reflect the environmental variation. In other words, depending on the sensed value of the dummy trace, it may identify whether the environment has changed, thus allowing a firmware to calibrate the sensor layer properly. In an embodiment, while sensing the dummy trace, the voltage of the sensor layer is set at ground potential to ensure a good shielding effect by the sensor layer.

Figure 1:
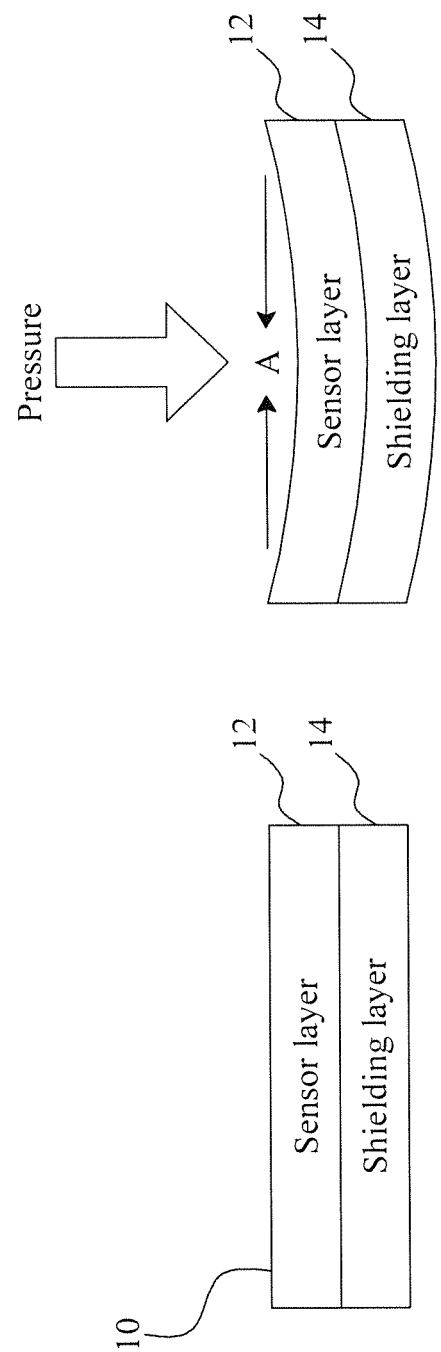
FIG. 1 schematically shows how a capacitive touch pad is affected by a pressure.
Figure 2:
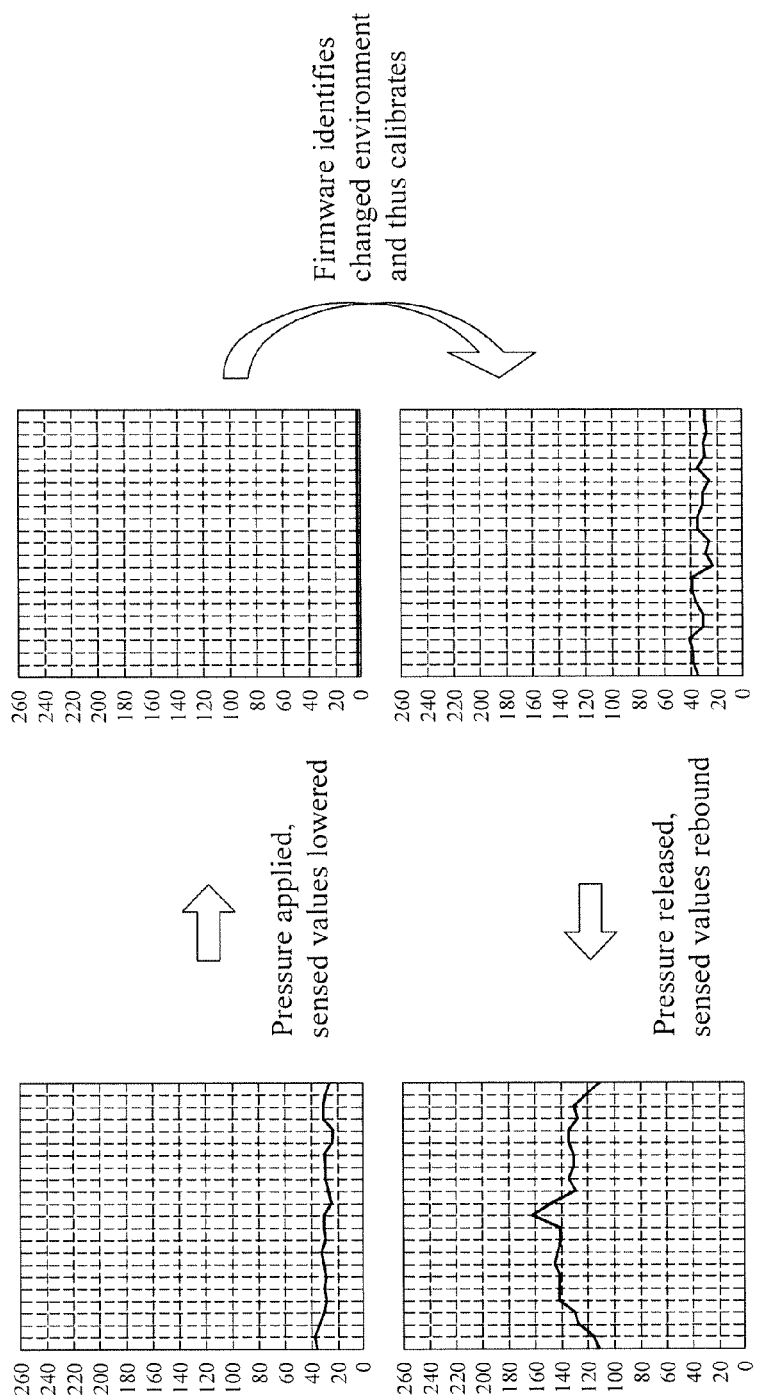
FIG. 2 shows plots demonstrating how the sensed values of a capacitive touch pad change with a pressure applied thereto.
Figure 3:
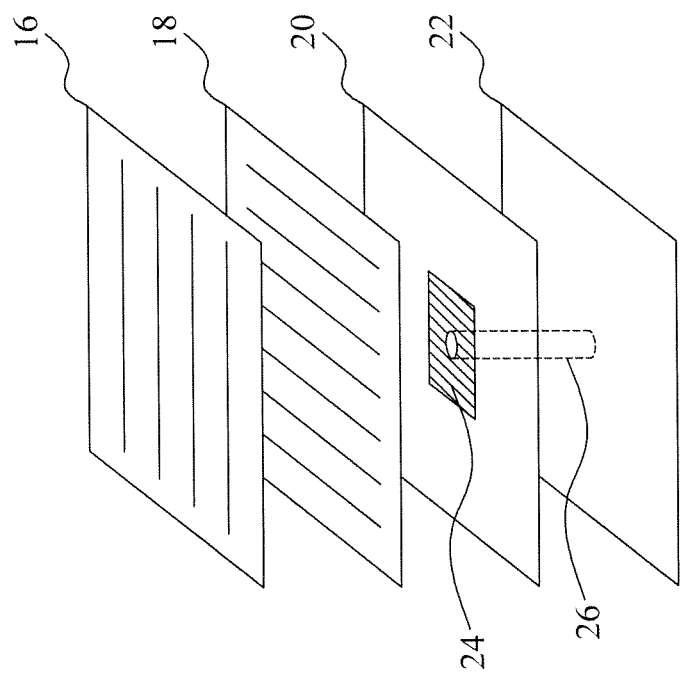
FIG. 3 is a schematic exploded view of a capacitive touch pad in an embodiment according to the present invention.

FIG. 3 is a schematic exploded view of a capacitive touch pad in an embodiment according to the present invention. In this embodiment, the capacitive touch pad has a four layer structure, including an X-direction sensor layer 16, a Y-direction sensor layer 18, a shielding layer 20 and a component layer 22, with an insulator material between each two adjacent layers for separating them. The shielding layer 20 below the X-direction sensor layer 16 and the Y-direction sensor layer 18 may shield the X-direction sensor layer 16 and the Y-direction sensor layer 18 from interference of the component layer 22 in operation. In this embodiment, a dummy trace 24 is provided in the same layer of the shielding layer 20 but is not electrically connected to the shielding layer 20. In an embodiment where a sensing circuit is provided on the component layer 22, the insulator material between the shielding layer 20 and the component layer 22 has a via 26 for electric connection of the sensing circuit to the dummy trace 24 such that the sensing circuit may sense the dummy trace 24 through the via 26. In an embodiment, the dummy trace 24 is at the same voltage potential as the shielding layer 20 when the X-direction sensor layer 16 or the Y-direction sensor layer 18 is sensed; therefore, the dummy trace 24 will not compromise the shielding effect of the shielding layer 20.

Figure 4:
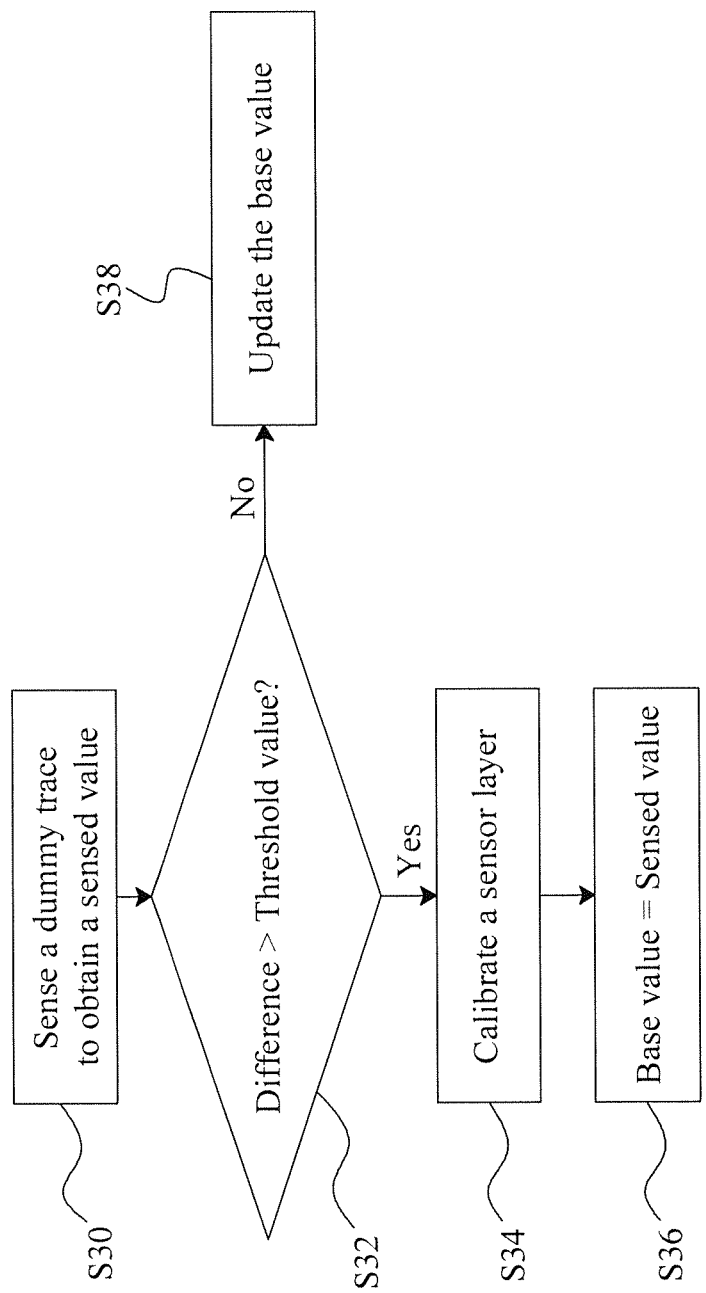
FIG. 4 is a flowchart of a method in an embodiment according to the present invention for eliminating the environmental interference to a capacitive touch pad.

In addition to hardware support, a firmware executes to perform a certain process on the dummy trace before or after the sensing of the sensor layers 16 and 18, so as to identify whether the environment has changed and whether the sensor layers 16 and 18 need to be calibrated again to eliminate the environmental interference. FIG. 4 is a flowchart of a method in an embodiment according to the present invention for eliminating the environmental interference to a capacitive touch pad. Prior to start of the process, a base value is set, which is the average value of the latest sensed values of a dummy trace and represents the condition of the sensing environment. Then, in step S30, the dummy trace is sensed to obtain a sensed value, and step S32 compares the difference between the sensed value and the base value with a threshold value. If the difference between the sensed value and the base value is not zero, it may indicate that the environment has changed. If the difference between the sensed value and the base value exceeds the threshold value, it is regarded as that the environment has undergone a dramatic change, and step S34 is performed to calibrate a sensor layer of the capacitive touch pad, thereby adjusting the capacitive touch pad to a stable state. In the following step S36, the base value is set at the sensed value. If step S32 identifies the difference less than the threshold value, the process goes to step S38, in which the sensed value is added to the previous sensed values and the sum is averaged to calculate a new base value. In another embodiment, different threshold values are defined for different environmental changes so that different calibration processes can be executed as appropriate.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touch pad, comprising:
   a sensor layer operative to sense a touch of an object, the sensor layer being formed by an X-direction sensor layer and a Y direction sensor layer, one disposed above the other;
   a shielding layer disposed below the sensor layer; and
   a dummy trace disposed in the same layer as the shielding layer, the dummy trace being at a same voltage potential as the shielding layer while the sensor layer is sensed;
   wherein the dummy trace is sensed to obtain a sensed value while the dummy trace is shielded by the sensor layer from interference of the object such that the sensed value reflects only environmental variation.

2. The capacitive touch pad of claim 1, further comprising a component layer below the shielding layer.

3. The capacitive touch pad of claim 1, wherein the shielding layer is not electrically connected to the dummy trace.

4. A capacitive touch pad, comprising:
   a sensor layer operative to sense a touch of an object, the sensor layer being formed by an X-direction sensor layer and a Y direction sensor layer, one disposed above the other;
   a dummy trace disposed below the sensor layer; and
   a shielding layer disposed below the dummy trace;
   wherein the dummy trace is sensed to obtain a sensed value while the dummy trace is shielded by the sensor layer from interference of the object such that the sensed value reflects only environmental variation.

5. The capacitive touch pad of claim 4, further comprising a component layer below the shielding layer.

6. A method for eliminating environmental interference to a capacitive touch pad having an X direction sensor layer and a Y direction sensor layer disposed in overlaying relationship one being disposed above the other for sensing a touch of an object, a shielding layer below the X direction sensor layer and the Y direction sensor layer, and a dummy trace disposed in a same layer as the shielding layer, the method comprising steps of:
   sensing the dummy trace to obtain a sensed value while the dummy trace is shielded by the X and Y direction sensor layers from interference of the object such that the sensed value reflects only environmental variation;
   comparing a difference between the sensed value and a base value with a threshold value;
   calibrating the sensor layer if the difference is greater than the threshold value; and
   applying a same voltage potential on the dummy trace as the shielding layer while the sensor layer is sensed.

7. The method of claim 6, further comprising a step of averaging a plurality of previous sensed values of the dummy trace as the base value.

8. The method of claim 6, further comprising a step of setting the base value at the sensed value after calibrating the sensor layer.

9. The method of claim 6, further comprising a step of setting different threshold values for different environmental changes.

\* \* \* \* \*